United States Patent
Gostein et al.

(10) Patent No.: US 11,650,103 B2
(45) Date of Patent: May 16, 2023

(54) MEASURING DIRECT, DIFFUSE, OR GLOBAL SOLAR IRRADIANCE USING MULTIPLE IRRADIANCE SENSORS

(71) Applicants: Michael Gostein, Austin, TX (US); William Stueve, Austin, TX (US)

(72) Inventors: Michael Gostein, Austin, TX (US); William Stueve, Austin, TX (US)

(*) Notice: Subject to any disclaimer, the term of this patent is extended or adjusted under 35 U.S.C. 154(b) by 46 days.

(21) Appl. No.: 16/912,273

(22) Filed: Jun. 25, 2020

(65) Prior Publication Data
US 2020/0408605 A1 Dec. 31, 2020

Related U.S. Application Data

(60) Provisional application No. 62/938,003, filed on Nov. 20, 2019, provisional application No. 62/866,592, filed on Jun. 25, 2019.

(51) Int. Cl.
*G01J 1/42* (2006.01)
*G01J 5/03* (2022.01)
*G01J 1/02* (2006.01)

(52) U.S. Cl.
CPC .............. *G01J 5/03* (2022.01); *G01J 1/0238* (2013.01); *G01J 1/4228* (2013.01); *G01J 2001/4266* (2013.01)

(58) Field of Classification Search
CPC .......... G01S 3/786; G01S 17/46; G01S 3/783; G01S 7/481; G01S 3/8083; G01S 3/8086; G01J 1/42
USPC .................................. 250/203.4, 221.214 R
See application file for complete search history.

(56) References Cited

U.S. PATENT DOCUMENTS

| | | | |
|---|---|---|---|
| 4,491,727 A | 1/1985 | Appelbaum | |
| 5,148,012 A * | 9/1992 | Carter | G01S 3/7861 126/576 |
| 8,455,806 B2 * | 6/2013 | Judkins | F24S 50/20 250/203.4 |
| 8,972,221 B2 | 3/2015 | Kerrigan | |
| 10,533,892 B2 | 1/2020 | Brown | |
| 2013/0048048 A1 | 2/2013 | Flanery | |
| 2016/0237745 A1 | 8/2016 | Wen | |
| 2017/0097259 A1 | 4/2017 | Brown | |
| 2017/0276542 A1 | 9/2017 | Klawuhn | |
| 2018/0331653 A1 | 11/2018 | Gostein | |
| 2018/0341002 A1 | 11/2018 | Augustyn | |
| 2018/0343367 A1 | 11/2018 | Darvas | |

OTHER PUBLICATIONS

B. Steinmuller, "The Two Solarimeter Method for Insolation on Inclined Surfaces," Solar Energy, v. 25, pp. 449-460, 1980.
D. Faiman, et al., "Site-Independent Algorithm for Obtaining the Direct Beam Insolation from a Multi-Pyranometer Instrument," Solar Energy, v. 50, pp. 53-57, 1993.

(Continued)

*Primary Examiner* — Que Tan Le

(57) ABSTRACT

In one respect, disclosed is a device or system for solar irradiance measurement comprising at least two irradiance sensors deployed outdoors at substantially different angles, such that, by analysis of readings from said irradiance sensors, direct irradiance, diffuse irradiance, and/or global irradiance are determined. In another respect, the disclosed device or system may additionally determine ground-reflected irradiance.

6 Claims, 8 Drawing Sheets

(56) References Cited

OTHER PUBLICATIONS

B.K. Munger, et al., "An Improved Multipyranometer Array for the Measurement of Direct and Diffuse Solar Radiation," Proceedings of the Ninth Symposium on Improving Building Systems in Hot and Humid Climates, Arlington, TX, May 19-20, 1994.

B. Marion, "Multi-Pyranometer Array Design and Performance Summary," Proceedings of the 1998 American Solar Energy Society Annual Conference, Albuquerque, NM, Jun. 14-17, 1998.

J.-C. Baltazar et al., "Improved Methodology to Measure Normal Incident Solar Radiation with a Multi-Pyranometer Array," Energy Procedia, v. 57, pp. 1211-1219, 2014.

J.-C. Baltazar et al., "Improved Methodology to Evaluate Clear-Sky Direct Normal Irradiance with a Multi-Pyranometer Array," Solar Energy, v. 121, pp. 123-130, 2015.

\* cited by examiner

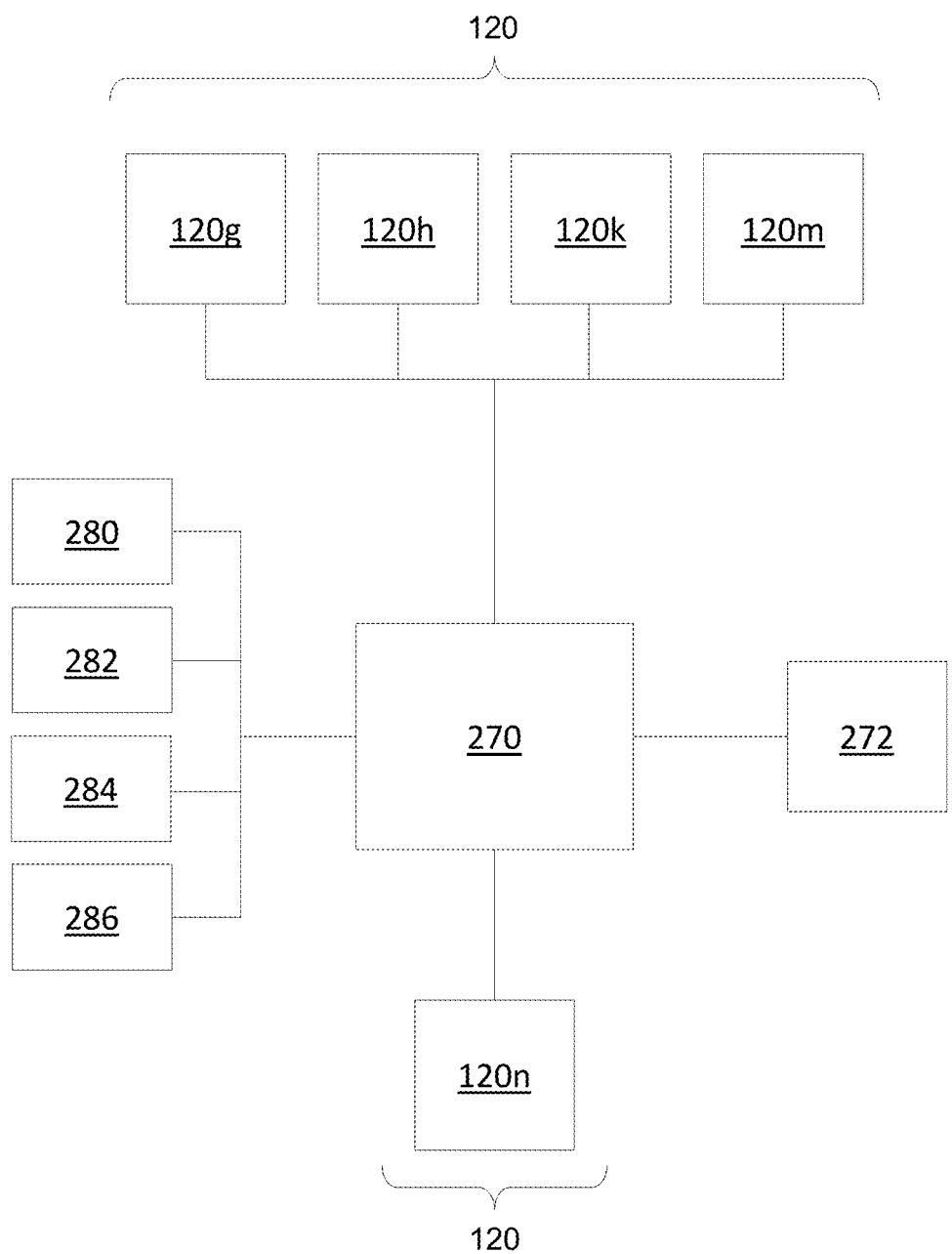

MEASURING DIRECT, DIFFUSE, OR GLOBAL SOLAR IRRADIANCE USING MULTIPLE IRRADIANCE SENSORS

CROSS-REFERENCE TO RELATED APPLICATIONS

This application claims priority to U.S. Provisional Patent Application 62/866,592, filed Jun. 25, 2019, and to U.S. Provisional Patent Application 62/938,003 filed Nov. 20, 2019.

FIELD OF THE INVENTION

The disclosed subject matter is directed to the measurement of solar irradiance.

SUMMARY

In one respect, disclosed is a device or system for solar irradiance measurement comprising at least two irradiance sensors deployed outdoors at substantially different angles, such that, by analysis of readings from said irradiance sensors, direct irradiance, diffuse irradiance, and/or global irradiance are determined. In another respect, the disclosed device or system may additionally determine ground-reflected irradiance.

BRIEF DESCRIPTION OF THE DRAWINGS

FIG. 8 depicts a block diagram of an embodiment similar to FIG. 7.

DETAILED DESCRIPTION OF THE INVENTION

Measurements of sunlight intensity, or solar irradiance, are important to the field of solar energy generation for purposes of both predicting and monitoring the performance of solar energy installations.

Figure 1:
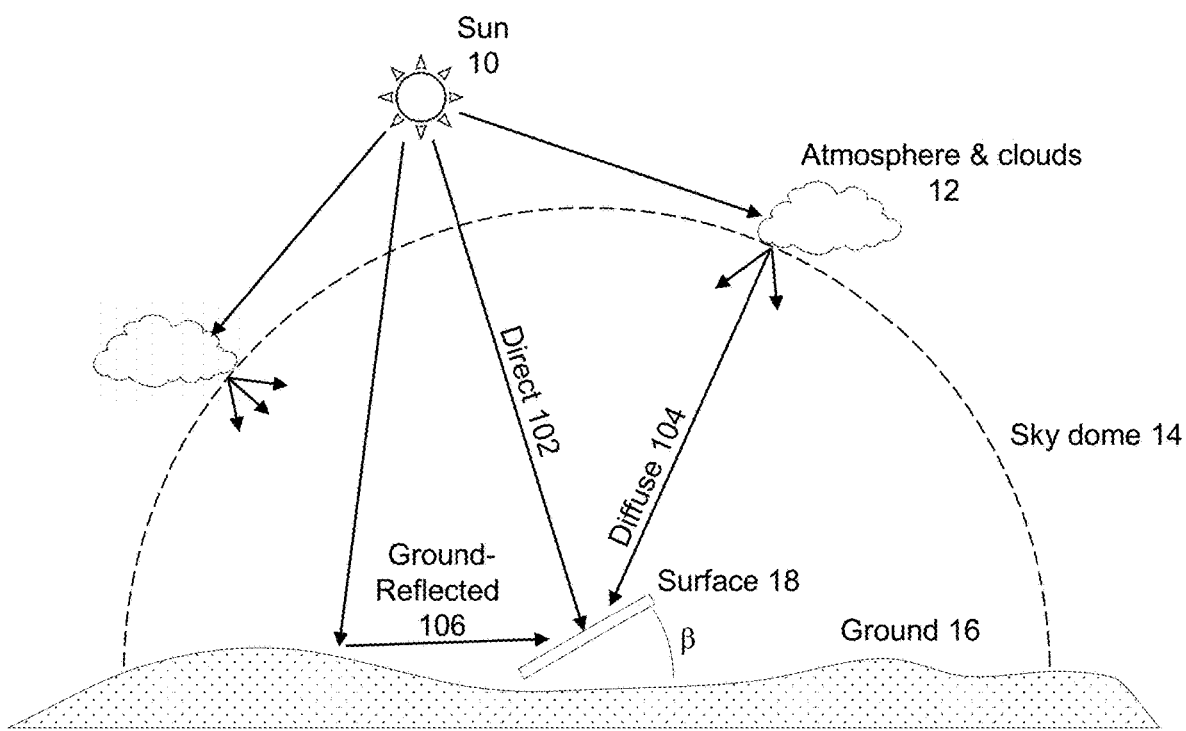
FIG. 1 depicts various components of solar radiation reaching a surface.

As depicted in FIG. 1, the solar radiation striking a surface (18) may consist of multiple components, including: direct irradiance (102), comprising rays emanating directly from the sun (10); diffuse irradiance (104), comprising rays that are scattered by the atmosphere or clouds (12) prior to striking the surface (18); and ground-reflected irradiance (106), comprising rays that scatter or reflect from the ground (16) prior to striking the surface (18). Note that FIG. 1 is not to scale and all rays emanating directly from the sun are nearly parallel at the earth.

In some embodiments direct irradiance (102) is quantified in terms of the radiation crossing a plane normal to rays emanating from the sun (10) and this is denoted as Direct Normal Irradiance (DNI). Other measures may also be used. Direct irradiance (102) may also be denoted as beam irradiance.

In some embodiments diffuse irradiance (104) is regarded as emanating equally from the entire sky dome (14). In some embodiments, diffuse irradiance (104) is regarded as having multiple components emanating from different portions of the sky dome (104). Such different components may include diffuse irradiance (104) emanating from the circumsolar disc (an angular region immediately around the sun (10)), diffuse irradiance (104) emanating from the horizon, and diffuse irradiance (104) emanating from the remainder of the sky dome (14), as well as other possible components. In some embodiments diffuse irradiance (104) is quantified as the sum of all diffuse irradiance (104) components reaching the top of a horizontal plane surface and this sum is denoted as Diffuse Horizontal Irradiance (DHI); in some embodiments various components of this sum are treated separately. Other measures of may also be used.

In some embodiments ground-reflected irradiance (106) may be quantified as the total reflected irradiance, generally diffuse, emanating upwards from the ground (16) and measured in a downward-facing horizontal plane, and may be denoted Ground-Reflected Irradiance (GRI). In some embodiments ground-reflected irradiance (106) is quantified in terms of albedo ρ, the ground-surface reflectivity or the ratio of upwelling irradiance (GRI) to downwelling irradiance (GHI). Other measures may also be used.

Irradiance reaching a surface (18) from 180 degrees field of view is denoted as global irradiance. Special cases include Global Horizontal Irradiance (GHI) for a horizontal surface (18) and Global Tilted Irradiance (GTI) for a tilted surface (18). Global irradiance at any surface (18) may have components of direct (102), diffuse (104), and ground-reflected (106) irradiance, and may be related to DNI, DHI, and GRI.

Figure 2:
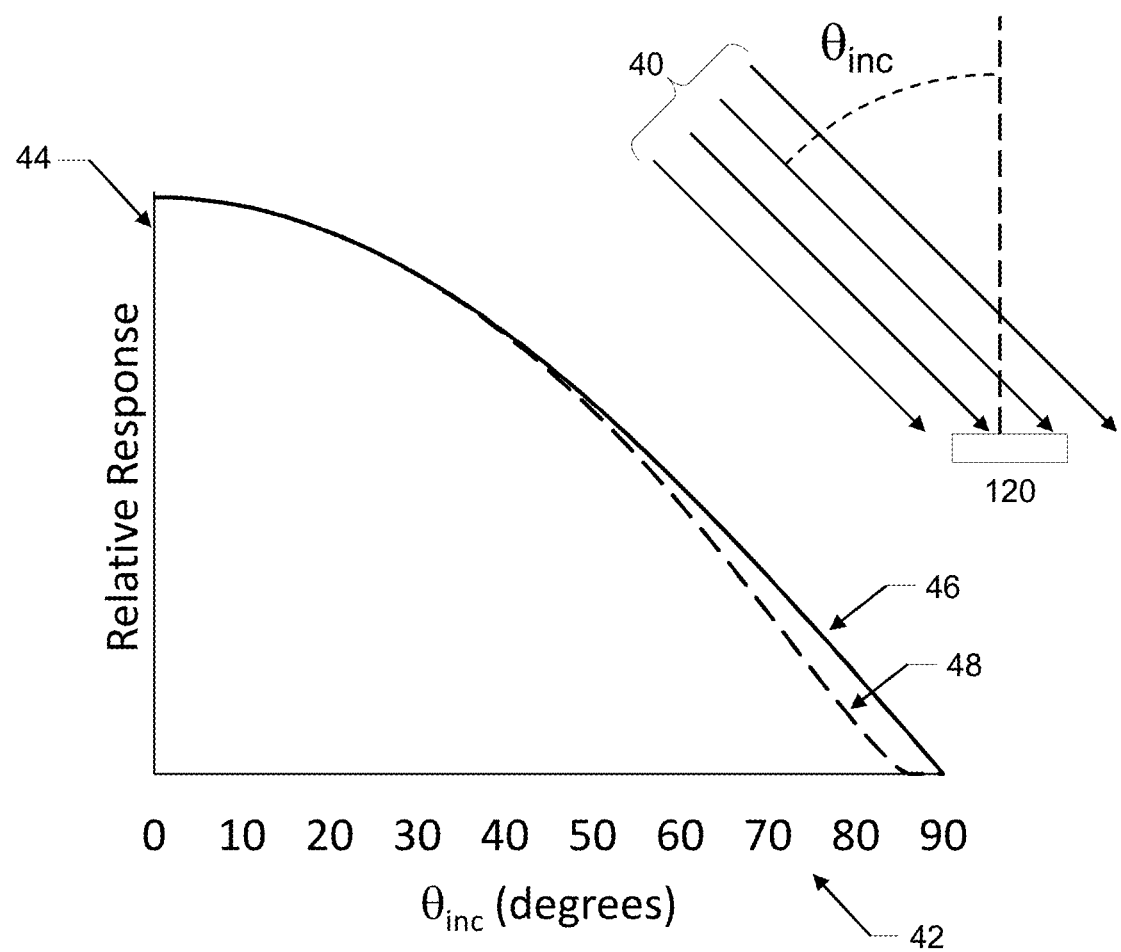
FIG. 2 depicts relative responses of an irradiance sensor to radiation versus angle of incidence.

As depicted in FIG. 2, the relative response (44) of an irradiance sensor (120) to radiation (40) decreases as the angle of incidence $\theta_{inc}$ increases. The graph depicts relative response (44) versus angle of incidence $\theta_{inc}$ (42). For an ideal irradiance sensor (120) the relative response decreases only as the cosine of $\theta_{inc}$ as shown by (46), i.e. in direct proportion to the reduction of its apparent cross-sectional area with respect to radiation (40). Irradiance sensors (120) may include, but are not limited, to pyranometers and photovoltaic (PV) reference cells. Pyranometers by design have a relative incidence-angle response close to the ideal (46), achieved by using a domed glass entrance window or a diffuser. PV reference cells, by contrast, have a flat glass entrance window similar to a small solar panel; accordingly reflection losses increase as a function of $\theta_{inc}$ and their incidence-angle response (48) is lower than that of pyranometers at high $\theta_{inc}$. The difference may be significant; for measurement of GHI in clear-sky conditions, a PV reference cell may measure ~6% less integrated irradiance over a full day relative to a pyranometer, due to its lower response at high $\theta_{inc}$.

In the drawings irradiance sensors (120) are depicted in a form representative of PV reference cells. However, other types of irradiance sensors (120), including pyranometers, could be substituted.

It is often desirable to separately measure direct (102), diffuse (104), and/or ground-reflected (106) components of solar irradiance, or to correct the readings of an irradiance sensor (120) for one or more of these components.

In some embodiments, disclosed is a device or system for solar irradiance measurement comprising at least two upwards-facing irradiance sensors (120) deployed outdoors at substantially different angles, such that, by analysis of readings from irradiance sensors (120), direct (102), diffuse (104), and/or global irradiance are determined. In some embodiments, disclosed is a device or system further comprising at least one downwards-facing irradiance sensor (120), such that, by analysis of readings from irradiance sensors (120), direct (102), diffuse (104), and/or global irradiance are determined together with ground-reflected irradiance.

Figure 3:
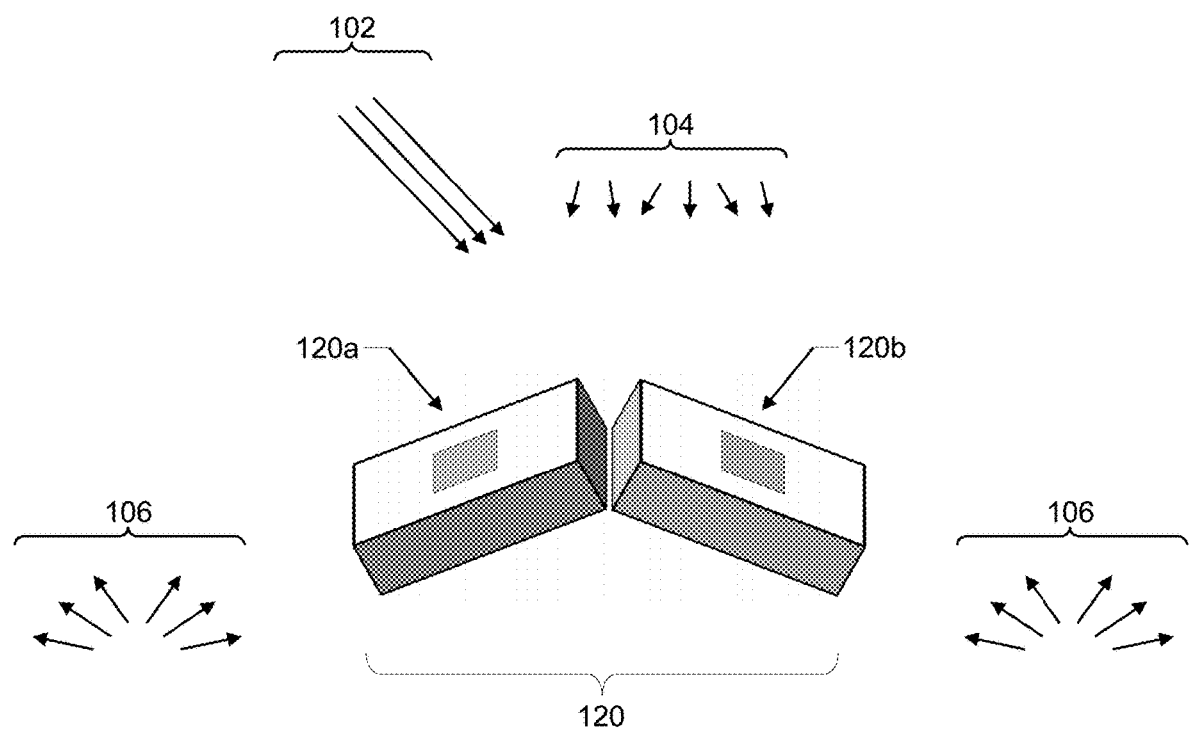
FIG. 3 depicts an embodiment comprising two upwards-facing irradiance sensors.

FIG. 3 depicts one embodiment of the disclosed subject matter. Two sky-facing irradiance sensors (120) are mounted at substantially different angular orientations. In an exemplary embodiment, one irradiance sensor (120a) faces south at an approximately 25-degree tilt angle, while a second irradiance sensor (120b) faces north at an approximately 25-degree tilt angle. Direct (102), diffuse (104), and ground-reflected irradiance (106) are present.

With reference to FIG. 3, the total irradiance $G_1$ detected by first irradiance sensor (120a) may be taken by the equation $$G_1 = a_1 \cdot G_{direct} + b_1 \cdot G_{diffuse} + c_1 \cdot G_{ground\text{-}reflected} \quad (1)$$

where $G_{direct}$, $G_{diffuse}$, and $G_{ground\text{-}reflected}$ are direct (102), diffuse (104), and ground-reflected (106) irradiance (or DNI, DHI, GRI), and $a_1$, $b_1$, and $c_1$ are coefficients quantifying the contribution of these irradiance components to the total detected irradiance. Coefficient $a_1$ is determined at least by the cosine of the angle of incidence $\theta_{inc}$ between the rays of direct irradiance (102) and the normal to the plane of first irradiance sensor (120a), as well as by the additional non-cosine portion of the incidence-angle response of first irradiance sensor (120a), e.g. as in (48) in the example in FIG. 2. Coefficient $b_1$ is determined at least by the angle between first irradiance sensor (120a) and the vertical (center of the sky dome (14)), as well as by said incidence-angle response of first irradiance sensor (120a). Coefficient $c_1$ is also determined at least by the angle between first irradiance sensor (120a) and the horizontal, as well as by said incidence-angle response of first irradiance sensor (120a). Since coefficients $a_1$, $b_1$, and $c_1$ are determined by properties of irradiance sensor (120a), its orientation, and the position of the sun (10), their values at a point in time may be calculated using appropriate models for given latitude and longitude. An exemplary model for determining diffuse irradiance (104) on a tilted plane as a function of DNI and DHI is provided by Perez, et al, Solar Energy 44 (5), 271-289, 1990 (incorporated herein by reference).

With reference to FIG. 3, the total irradiance $G_2$ detected by the second irradiance sensor (120b) may be written similarly to Eq. (1) but with the 1 subscripts replaced with 2's:

$$G_2 = a_2 \cdot G_{direct} + b_2 \cdot G_{diffuse} + c_2 \cdot G_{ground\text{-}reflected} \quad (2)$$

Coefficients $a_2$, $b_2$, and $c_2$ are determined analogously to $a_1$, $b_1$, and $c_1$, but their values are different because second irradiance sensor (120b) is oriented in a different direction.

In some embodiments, the third terms of Eq. (1) and Eq. (2) are neglected. By choosing the tilt angles β of first irradiance sensor (120a) and second irradiance sensor (120b) small enough, coefficients $c_1$ and $c_2$ become negligible, especially for irradiance sensors (120) having less-than-cosine incidence angle response as (48) in FIG. 2. In some embodiments, when ground-reflected irradiance (106) is neglected, by measuring $G_1$ and $G_2$ Eqs. (1) and (2) may be directly solved to determine $G_{direct}$ and $G_{diffuse}$ or equivalently DNI and DHI. Equivalently, from these values GHI and/or GTI may be calculated.

In some embodiments, ground-reflected irradiance (106), $G_{ground\text{-}reflected}$, is not neglected but is assumed to have a known small value (for example, calculated from $G_{direct}$ and $G_{diffuse}$ and the known reflectivity or albedo ρ of the surrounding ground surface). In this case, Eqs. (1) and (2) may again be solved to determine $G_{direct}$ and $G_{diffuse}$.

Figure 4:
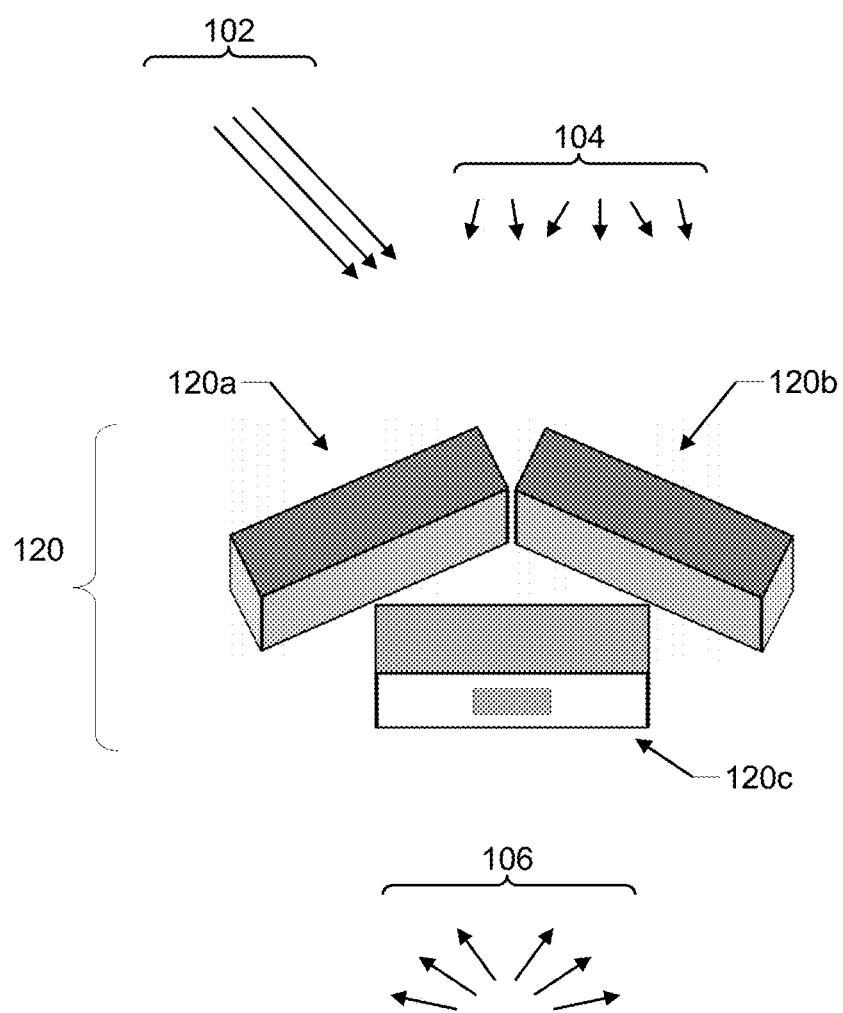
FIG. 4 depicts an embodiment similar to FIG. 3 further comprising a downwards-facing irradiance sensor.

FIG. 4 depicts an embodiment similar to FIG. 3 but additionally comprising a third downwards-facing irradiance sensor (120c) oriented towards ground-reflected irradiance (106). The irradiance $G_3$ detected by downwards-facing irradiance sensor (120c) may be written simply as $$G_3 = c_3 \cdot G_{ground\text{-}reflected} \quad (3)$$

where $c_3$ is again a function of the orientation and angular response of third downwards-facing irradiance sensor (120c). In some embodiments downwards-facing irradiance sensor (120c) is oriented directly downward and has broad angular response, such that $c_3$ is assumed equal to one for practical purposes, while in other embodiments $c_3$ may have other values. In some embodiments of the arrangement depicted in FIG. 3, by measuring $G_1$, $G_2$, and $G_3$, Eqs. (1), (2), and (3) may be solved to determine $G_{direct}$, $G_{diffuse}$, and $G_{ground\text{-}reflected}$ or equivalently DNI, DHI, and GRI. Equivalently, from these values GHI and/or GTI may be calculated.

Figure 5:
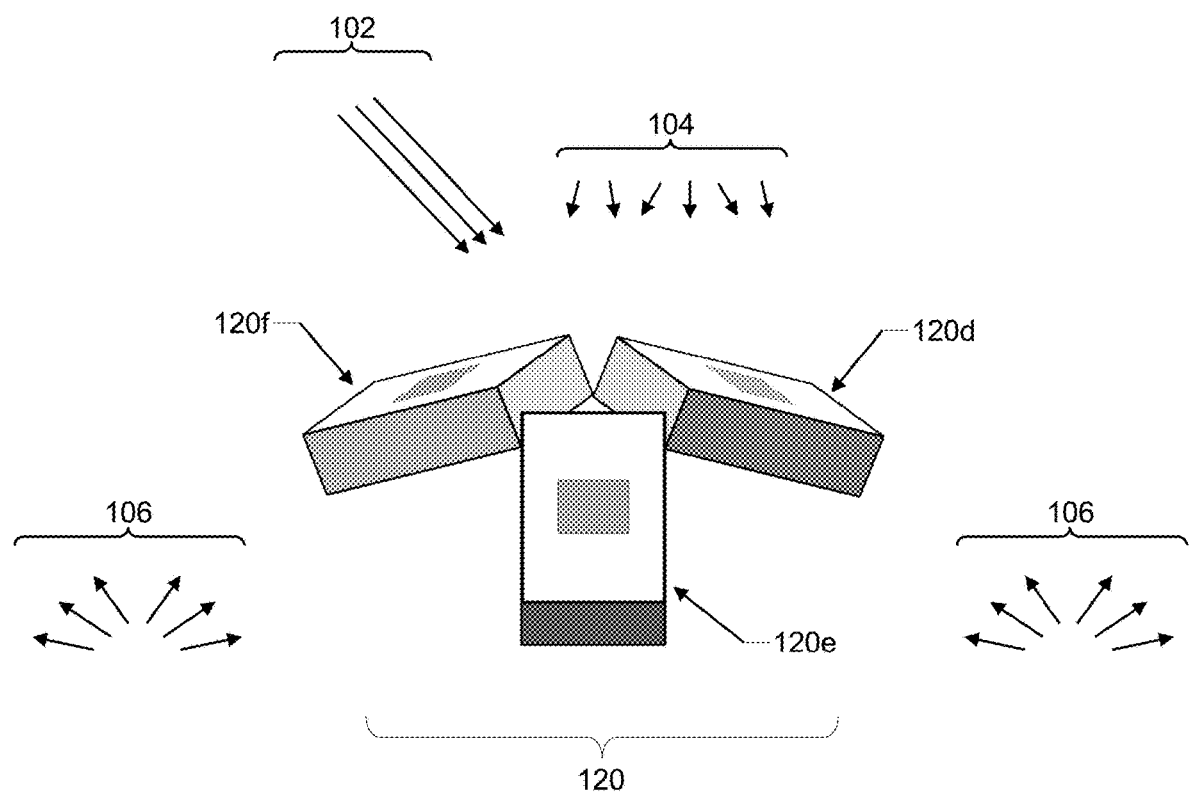
FIG. 5 depicts an embodiment comprising three upwards-facing irradiance sensors.

FIG. 5 depicts another embodiment, comprising three upwards-facing irradiance sensors (120d, 120e, 120f), each with approximately 25-degree tilt and with azimuthal orientations distributed approximately equally around 360 degrees of arc. In one embodiment, one irradiance sensor (120d) in FIG. 5 is intended to be directed approximately north or south. In some embodiments the use of three upwards-facing irradiance sensors (120) provides better ability to determine irradiance components $G_{direct}$ and $G_{diffuse}$. In embodiments with only two upwards-facing irradiance sensors (120) as in FIG. 3, there may be up to two time ranges during each day when the angle of incidence $\theta_{inc}$ on each upwards-facing irradiance sensor (120) is nearly equal, causing Eq. (1) and Eq. (2) to become nearly equal or degenerate, rendering accurate solution difficult. In some embodiments inclusion of a third upwards-facing irradiance sensor (120) as in FIG. 5 overcomes this limitation. In addition, in some embodiments inclusion of third upwards-facing irradiance sensor (120) as in FIG. 5 may result in measurement equations that are typically over-determined, i.e. contain more knowns than unknowns, resulting in lower uncertainty.

In other embodiments, two or more irradiance sensors (120) are oriented at different angles than those depicted in FIG. 3, FIG. 4, or FIG. 5, and irradiance components $G_{direct}$, $G_{diffuse}$, and/or $G_{ground\text{-}reflected}$ are similarly determined by analysis of the readings of the two or more irradiance sensors (120). For example, with reference to FIG. 3, FIG. 4, and FIG. 5, an embodiment could contain any number of upwards-facing irradiance sensors (120) oriented along different directions, in order to better determine the irradiance components. In general, an embodiment could contain an arbitrary number of irradiance sensors (120) oriented in different directions, including upwards- and downwards-facing irradiance sensors (120) or additionally vertically oriented irradiance sensors (120). The measurement may be exactly determined (same number of measurements and unknowns) or over-determined (more measurements than unknowns). In some embodiments the orientations of the irradiance sensors (120) are substantially different so that the multiple readings provide enough information for successful calculation despite measurement and modeling error.

The mathematical representation may be generalized. Consider a system with multiple irradiance sensors (120) disposed at different tilt and azimuth angles. At a point in time, the predicted irradiance that would be measured on sensor i can be written as:

$$G_{(i),pred} = f(\theta_z, \gamma_s, DNI, DHI, \beta_{(i)}, \gamma_{(i)}, S_{(i)}) \quad (4)$$

where $\theta_z$ and $\gamma_s$ are the solar zenith and azimuth angles, DNI and DHI are the direct normal and diffuse horizontal irradiance at the time point, $\beta_{(i)}$ and $\gamma_{(i)}$ are the tilt and azimuth angles of irradiance sensor i, and $S_{(i)}$ is a vector of constants for sensor i which may quantify incidence-angle response and other sensor-specific parameters.

The function $f$ includes a sum of terms for the contributions of direct (102), diffuse (104), and ground-reflected (106) irradiance. In a simple conceptual model, $f$ could be expanded as the sum of three terms such that $$G_{(i),pred} = \\ IAM_{(i),dir} \cdot DNI \cdot \cos(\theta_{(i),inc}) + IAM_{(i),diff} \cdot DHI \cdot \left(\frac{1+\cos\beta_{(i)}}{2}\right) + \\ IAM_{(i),gr} \cdot \rho \cdot (DNI \cdot \cos\theta_z + DHI) \cdot \left(\frac{1-\cos\beta_{(i)}}{2}\right) \quad (5)$$

where $\theta_{(i),inc}$ is the solar angle of incidence on sensor i, which is a function of $\theta_z$, $\gamma_s$, $\beta_{(i)}$, and $\gamma_{(i)}$, $\rho$ is the ground surface albedo, and $IAM_{(i),dir}$, $IAM_{(i),diff}$, and $IAM_{(i),gr}$ are incidence angle modifiers for direct, diffuse, and ground-reflected radiation, respectively, on sensor i. $IAM_{(i),dir}$ is a function of $\theta_{(i),inc}$ that quantifies the ratio of sensor i response to a cosine function (e.g. the ratio of (48) to (46)); $IAM_{(i),diff}$ and $IAM_{(i),gr}$ are scalars that quantify the relative fraction of diffuse irradiance (104) and ground-reflected irradiance (106), respectively, for which sensor i is responsive (e.g. calculated from integrals over (48)). These terms may include constants based on the sensor properties parameterized by $S_{(i)}$.

Equation (5) is a simplified model. In some embodiments, the terms for diffuse irradiance (104) are further separated at least into circumsolar, sky, and horizon components. For such models the diffuse irradiance (104) reaching an arbitrary surface (18) (or equivalently, an irradiance sensor (120)), may become a function of both DNI and DHI. Irradiance measured in one plane can be effectively transposed to another plane, such as the plane of sensor i, by a model such as the "Perez" model described in R. Perez, P. Ineichen, R. Seals, J. Michalsky, and R. Stewart, "Modeling daylight availability and irradiance components from direct and global irradiance," *Solar Energy*, vol. 44, no. 5, pp. 271-289, 1990 (incorporated herein by reference), including subsequent updates and computer implementations. Equivalently, other transposition models may be used. In some embodiments, in each such model one or more of the terms are multiplied by an incidence angle modifier to correct for the non-cosine portion of the angle-of-incidence response of the actual sensor i to a particular irradiance component.

With reference to Eq. (5) or equivalently its analog for more complex models, since the contributions of direct (102), diffuse (104), and ground-reflected irradiance (106) to each irradiance sensor (120) i depend on its orientation, when there are multiple irradiance sensors (120) at different orientations it is possible to use a group of irradiance sensor (120) measurements to solve for direct (102), diffuse (104), and/or ground-reflected (106) irradiance components. Let the measured irradiance at sensor i be written as $G_{(i),meas}$. Then, in some embodiments, DNI, DHI, and/or GRI may be determined by finding values that minimize a goodness-of-fit function such as $$GOF = \Sigma_i (G_{(i),pred} - G_{(i),meas})^2 \quad (6)$$

which, in some embodiments, may be performed by iterative adjustment of trial values.

Calculation of results has multiple possible embodiments. In some embodiments, equations for irradiance detected by each irradiance sensor (120) (e.g. Eqs. (1), (2), (3) or their analogues for different number and/or arrangement of irradiance sensors (120)), are solved algebraically to directly yield values for direct (102), diffuse (104), and/or ground-reflected (106) irradiance. In other embodiments, trial values for direct (102), diffuse (104), and/or ground-reflected (106) irradiance are iteratively adjusted to yield best fit between predicted and measured readings of the irradiance sensors (120) (e.g. Eqs. (4), (5), (6) or similar). In other embodiments, measurements from individual irradiance sensors may be each broken into direct (102), diffuse (104), and/or ground-reflected (106) irradiance components using an irradiance decomposition model which estimates components contributing to a global irradiance, such as the DIRINT or GTI-DIRINT model (Bill Marion, "A model for deriving the direct normal and diffuse horizontal irradiance from the global tilted irradiance", *Solar Energy*, v. 122, pp. 1037-1046, 2015, incorporated by reference), and final values for direct (102), diffuse (104), and/or ground-reflected (106) irradiance may be determined from the collection of individually-derived values, such as by averaging the individually derived values among the multiple irradiance sensors (120) or iterative operation of the models until convergence is achieved.

In general, a variety of calculation approaches are possible, including direct algebraic solution, least-squares algebraic solution of over-determined equations, iterative fitting, estimation models, and estimation models coupled with iterative fitting, each of which has been described. Other calculation approaches may also be possible.

In some embodiments calculation to separate direct (102) and diffuse (104) irradiance components may be accomplished by using at least two upwards-facing irradiance sensors (120) having substantially different orientation. In one embodiment, substantially different may be quantified by a minimum threshold on the difference of the cosine of the solar angle of incidence upon at least one pair of irradiance sensors (120). For example, in some embodiments a minimum difference of at least 0.05 or at least 0.1 in the cosine may be considered substantially different to allow successful calculation, while smaller differences in cosine of solar angle of incidence produce degenerate measurement equations that cannot be reliably solved. Other measures of degeneracy could also be used. Since solar angle of incidence varies in time (throughout the day and throughout the year), in some embodiments calculation to independently resolve irradiance components may be successful at particular times of the day and/or year, but not successful at others. In some embodiments, orientations of irradiance sensors (120) are chosen to minimize the number of hours of degeneracy for a given location throughout the year. Exemplary such embodiments suitable for a wide range of latitudes are depicted in FIG. 5 and FIG. 7. In some embodiments, during periods of degeneracy the device or system may estimate direct (102) and/or diffuse (104) irradiance using an a decomposition model, such as the DIRINT or GTI-DIRINT decomposition models referenced above or through other estimation models including models relying on a time series of data. In some embodiments, a device or system automatically switches between calculation of direct (102), diffuse (104), and/or ground-reflected (106) irradiance components from solution of measurement equations to estimation of these components using decomposition or other models; in some embodiments, said automatic switching is performed based on estimates of the degeneracy of the measurement equations at a particular time point, e.g. based on the largest usable difference in the value of cosine of angle of incidence between any pair of irradiance sensors (120), or other estimates of degeneracy; in some embodiments, as degenerate conditions are approached, a device or system blends smoothly between calculation and estimation.

In some embodiments calculation of results may be accomplished with knowledge of the angular orientations of each irradiance sensor i (tilt $\beta_{(i)}$ and azimuth $\gamma_{(i)}$ with respect to earth coordinates). In some embodiments irradiance sensors are fixed by construction in a particular arrangement wherein their relative tilt angles and azimuthal orientations are known, such that determination of an overall device or system tilt $\beta_0$ and azimuthal orientation $\gamma_0$ may be made for a particular installation and all individual tilt $\beta_{(i)}$ and azimuth $\gamma_{(i)}$ may be computed by known relative differences from the device or system $\beta_0$ and $\gamma_0$.

In some embodiments tilt $\beta_0$ may be determined by requiring leveling of a device or system upon installation. In some embodiments tilt $\beta_0$ may be automatically measured by an included tilt sensor or inclinometer.

In some embodiments an electronic compass is included to facilitate automatic determination of azimuthal orientation $\gamma_0$. In some embodiments said compass readings are automatically corrected for magnetic declination at the installation site latitude and longitude using a lookup table, function, or similar means.

In some embodiments, azimuthal orientation $\gamma_0$ is automatically determined from measurements by irradiance sensors (120). This may be performed, for example, by treating azimuthal orientations ($\gamma_{(i)}$ and/or $\gamma_0$ wherein $\gamma_{(i)}$ are fixed relative to $\gamma_0$) as one or more additional unknowns in the measurement equations (Eqs. (1)-(6) and analogues for other models or arrangements of sensors) which are determined by direct solution of the multiple equations or iterative fitting of measured data to determine optimized values, including using time series of data. For example, during clear-sky conditions, the time series data of a tilted irradiance sensor will depend on its azimuthal orientation, such that by analyzing the time series data azimuthal orientation may be determined. In some embodiments, clear-sky conditions are automatically detected from irradiance readings, allowing automatic determination of azimuthal orientation. In some embodiments, clear-sky conditions are detected based on irradiance level relative to modeled clear-sky expectations for the location. In some embodiments, clear-sky conditions are detected based on statistical fluctuation of time series data, wherein lower fluctuation is more correlated with clear skies. Automatic determination of azimuthal orientation may be performed once upon installation and/or at routine intervals.

Figure 6:
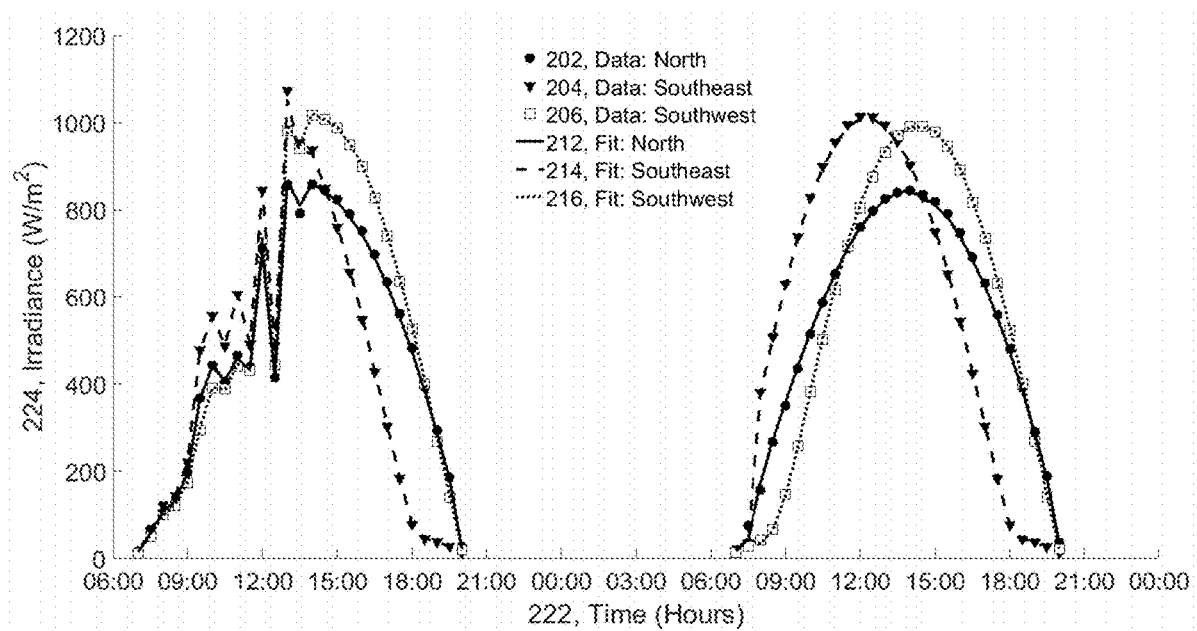
FIG. 6 depicts measured (data) and modeled (fit) irradiance versus time from irradiance sensors facing different directions.

FIG. 6 illustrates automatic determination of azimuthal orientations by fitting time series data. The figure depicts measurements of irradiance sensors (120) in an embodiment similar to FIG. 5, with irradiance (224) versus time (222) on two consecutive days. Three irradiance sensors (120d, 120e, 120f) facing nominally north, southeast, and southwest have measured data shown as (202), (204), (206) respectively and model fits as (212), (214), (216). The irradiance (224) profile measured on each irradiance sensor (120d, 120e, 120f) depends critically on time (222) according to its azimuthal orientation. The morning of the first day in FIG. 6 is identified as cloudy due to fluctuations in irradiance, while the first afternoon and the entire second day are identified as having clear-sky conditions due to the expected profile and low fluctuations. Fitting of the data using azimuthal orientations as one or more free variables allows precise determination of $\gamma_0$ and/or $\gamma_{(i)}$.

In some embodiments calculation of results may be accomplished with accurate knowledge of latitude and longitude of the device or system together with accurate time. In some embodiments, a user provides input for latitude and longitude of the installation site. In some embodiments a Global Positioning System (GPS) is also included within the device or system to facilitate automatic determination of latitude and longitude. In other embodiments, latitude and longitude may be additional unknowns to be determined by fitting.

In one embodiment, a system or device according to the disclosed subject matter comprises a computing element (270) which records measurements of irradiance sensors (120), analyzes results, and performs other tasks. In one embodiment, computing element (270) is contained within or collocated with irradiance sensors (120). In one embodiment, computing element (270) is remote.

In one embodiment, irradiance sensors (120) are combined into a single enclosure as a unit.

Figure 7A:
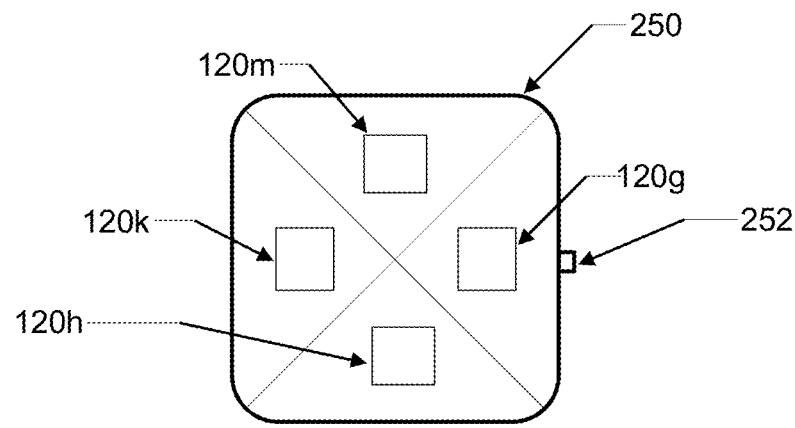
FIG. 7A depicts a top view of an embodiment comprising four upwards-facing irradiance sensors and one downwards-facing irradiance sensor.
Figure 7B:
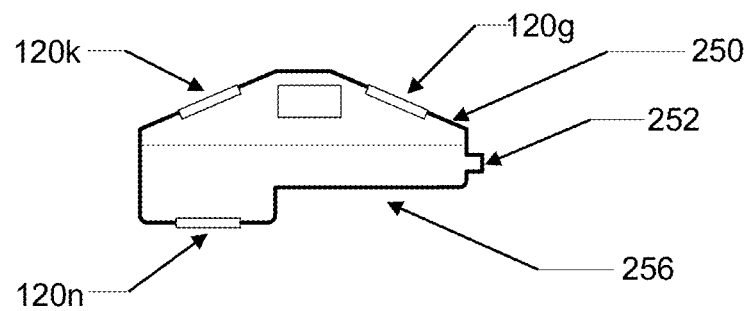
FIG. 7B depicts a side view of an embodiment comprising four upwards-facing irradiance sensors and one downwards-facing irradiance sensor.
Figure 7C:
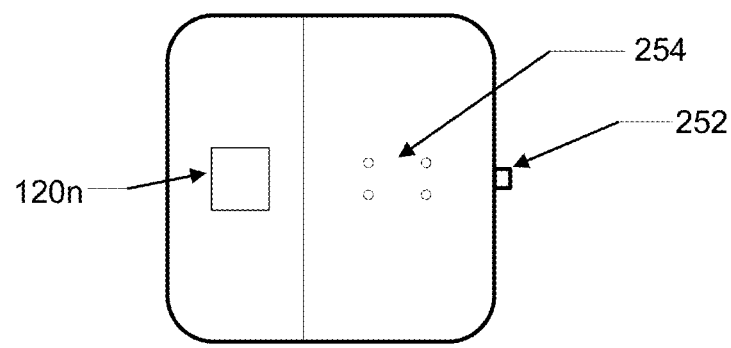
FIG. 7C depicts a bottom view of an embodiment comprising four upwards-facing irradiance sensors and one downwards-facing irradiance sensor.

FIGS. 7A, 7B, and 7C together depict an exemplary embodiment in which five irradiance sensors (120)—four sky-facing irradiance sensors (120g, 120h, 120k, 120m) and one ground-facing irradiance sensor (120n)—are integrated into a single device. FIG. 7A is a top view, FIG. 7B is a side view, and FIG. 7C is a bottom view. The device comprises an enclosure (250) whose top side has a pyramidal shape. The four sky-facing irradiance sensors (120g, 120h, 120k, 120m) are at 25-degree tilt and face different compass directions. A recess (256) on the bottom side of the device provides a mounting location (254) for a mounting bracket, and an electrical connector (252) provides for power and communication signals. In some embodiments, a computing element (270) is included to automatically process readings from the irradiance sensors (120) and calculate results. In some embodiments, a tilt sensor (280), electronic compass (282), accurate clock (284), and/or GPS receiver (286) are included.

FIG. 8 depicts a block diagram of an exemplary embodiment similar to FIG. 7, comprising four sky-facing irradiance sensors (120g, 120h, 120k, 120m); one ground-facing irradiance sensor (120n); a computing element (270) which processes readings from irradiance sensors (120), calculates results, and performs other tasks; a tilt sensor (280) to determine system $\beta_0$; electronic compass (282) to assist in determining $\gamma_0$; accurate clock (284); GPS receiver (286) for determining latitude, longitude, and/or time; and/or communication circuitry (272).

In some embodiments, irradiance sensors (120) are routinely cleaned by personnel or automated equipment to remove the accumulation of soiling particles which reduce the measured irradiance. In some embodiments, a soiling measurement device is coupled with the device or system in order to measure the extent of soiling particle accumulation on one or more of irradiance sensors (120) such that readings of one or more irradiance sensors (120) are corrected for losses due to soiling. The soiling measurement device could comprise, for example, a Mars™ soiling sensor (Gostein et al, "Mars Soiling Sensor™" 2018 IEEE 7th World Conference on Photovoltaic Energy Conversion Joint Conference of 45th IEEE PVSC, 2018, pp. 3417-3420, incorporated herein by reference), or another similar or related device.

In some embodiments, soiling, fouling, degradation, or malfunction of one or more of irradiance sensors (120) may be automatically determined. In some embodiments, determination of soiling, fouling, degradation, or malfunction is performed by intercomparing readings of sky-facing irradiance sensors (120) during cloudy conditions when their irradiance readings may be identical despite their different orientations. Sufficiently cloudy conditions may be automatically detected from irradiance and irradiance fluctuation levels. In some embodiments determination of soiling, fouling, degradation, or malfunction is performed during clear-sky conditions, during which sky-facing irradiance sensors (120) read differently due to different orientation. In some embodiments this is accomplished by comparing the reading of each irradiance sensor (120) to a predicted clear-sky value using a model. In some embodiments this is accomplished by using a decomposition model to estimate direct (102) and/or diffuse (104) irradiance from the reading of each irradiance sensor (120) and comparing the decomposed values. In some embodiments, souling, fouling, degradation, or malfunction of a ground-facing irradiance sensor (120) is performed by comparing measured albedo to expectations. In some embodiments any of the mentioned comparisons may be performed automatically at routine intervals. In some embodiments, a ratio of actual to predicted or modeled irradiance readings is used to quantify the soiling, fouling, degradation or malfunction of each irradiance sensor (120). In some embodiments the readings of one or more individual irradiance sensors (120) may be automatically corrected or alerts may be provided indicating a sensor is out-of-tolerance.

In some embodiments, a disclosed device or system is used to measure a global irradiance using a type of irradiance sensor (120), such as a PV reference cell with a flat glass window, that would normally be inaccurate for measuring a global irradiance due to excessive non-cosine dependence of response versus incidence angle. With reference to (48) vs. (46) in FIG. 2, a PV reference cell has significantly reduced response at high incidence angle relative to the ideal cosine response. For measurement of a global irradiance such as GHI or GTI this may result in on the order of 6% integrated error over the course of a clear day or on the order of 5% instantaneous error during cloudy conditions. Correction for this effect can be performed but only if the relative intensities of direct (102) and diffuse (104) irradiance are known. Therefore, in some embodiments, multiple sky-facing irradiance sensors (120) are used to determine direct (102) and diffuse (104) irradiance from which an accurate global irradiance, corrected for irradiance sensor (120) angular response, is determined. In such embodiments where the objective is only measurement of a global irradiance, accuracy requirements for calculation of the underlying direct (102) and diffuse (104) irradiance components are lessened, and these components may or may not be reported to a user. Correction of downward-facing irradiance sensor (120) for incidence angle response may also be performed by using pre-calculated incidence angle modifiers for ground-reflected diffuse and direct irradiance components.

In some embodiments, a device or system according to the enclosed subject matter computes and/or measures any of a number of irradiance components or metrics which may be derived from the readings of irradiance sensors (120), including: direct irradiance (102), diffuse irradiance (104), ground-reflected irradiance (106), global horizontal irradiance, plane-of-array irradiance, global tilted irradiance on an arbitrary plane, albedo (ratio of horizontal upwelling to horizontal downwelling irradiance), and others.

Although this disclosure is directed to the application of measuring direct, diffuse, or global solar irradiance, it will be understood by those skilled in the art that the disclosed subject matter has other applications.

The invention claimed is:

1. A device or system comprising
at least two irradiance sensors and
at least one computing element coupled to said irradiance sensors;
wherein said at least two irradiance sensors have different angular orientations, and
wherein, based at least upon readings of said irradiance sensors, said computing element is configured to determine values of both direct and diffuse irradiance components of a total irradiance,
wherein said at least two irradiance sensors comprise photovoltaic (PV) reference cells with flat glass windows and have a significant non-cosine component of incidence angle response.

2. The device or system of claim 1, wherein at least one of said irradiance sensors is ground-facing or receives primarily ground-reflected radiation.

3. The device or system of claim 2, wherein said computing element is configured to determine values of a ground-reflected irradiance or an albedo.

4. The device or system of claim 1, wherein said computing element is configured to determine at least one azimuthal orientation of said device or system based at least upon readings of at least one of said irradiance sensors.

5. The device or system of claim 1, wherein said computing element is configured to determine soiling, fouling, degradation, or malfunction of at least one of said irradiance sensors by comparing at least two of said irradiance sensors on the basis of their readings, estimates derived from their readings, agreement of their readings with a model, or fit of their readings with a model.

6. The device or system of claim 5, wherein said computing element is configured to correct measurements of at least one of said irradiance sensors for said soiling, fouling, degradation or malfunction.

* * * * *